Aug. 4, 1936.  G. J. HOLT ET AL  2,050,179
TRACK HANDLING MACHINE
Original Filed Feb. 26, 1930   5 Sheets-Sheet 3
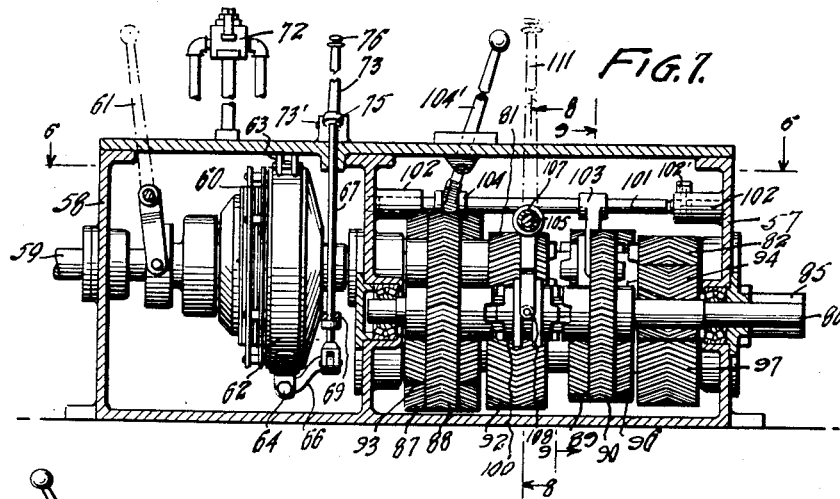
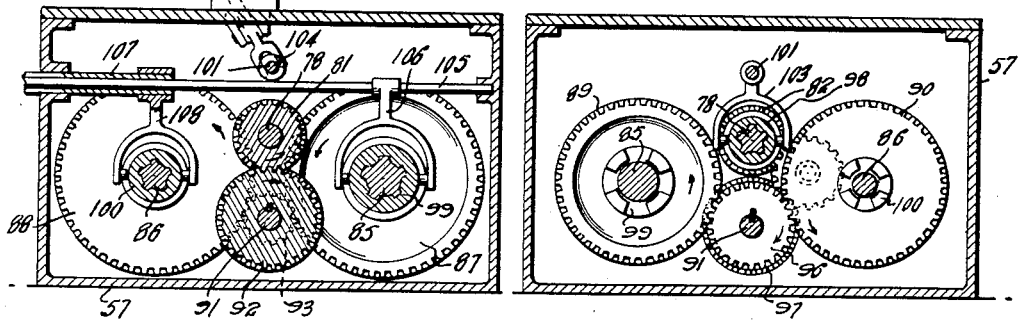
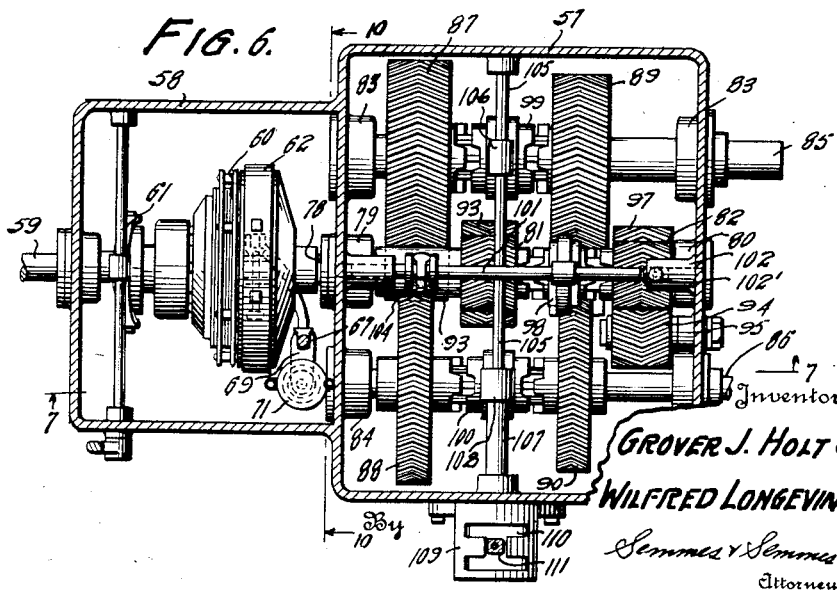
Inventor
GROVER J. HOLT &
WILFRED LONGEVIN
By Semmes & Semmes
Attorneys

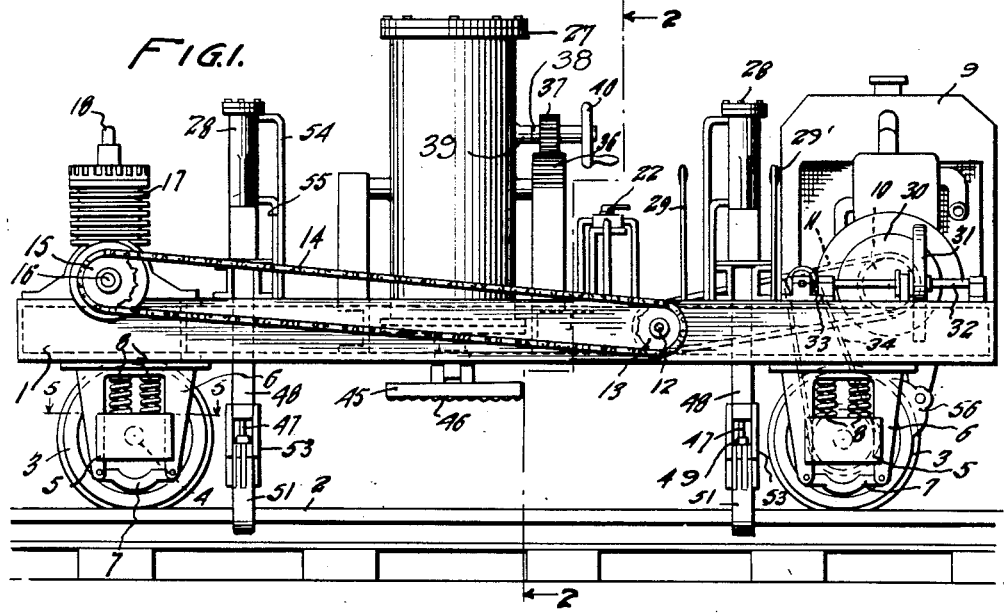

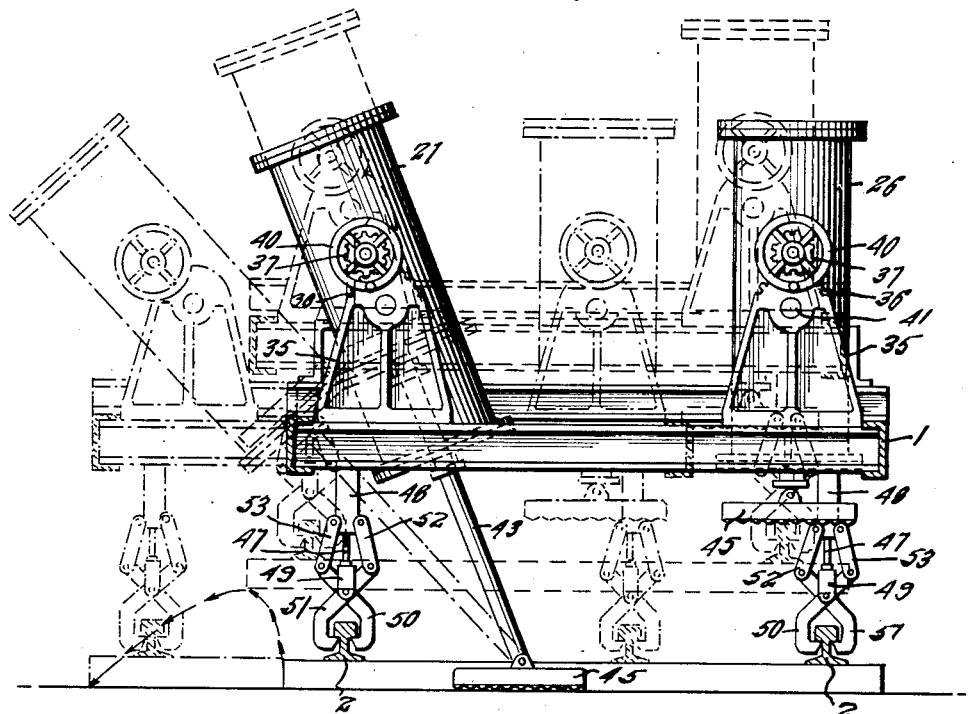
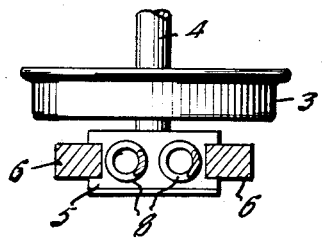
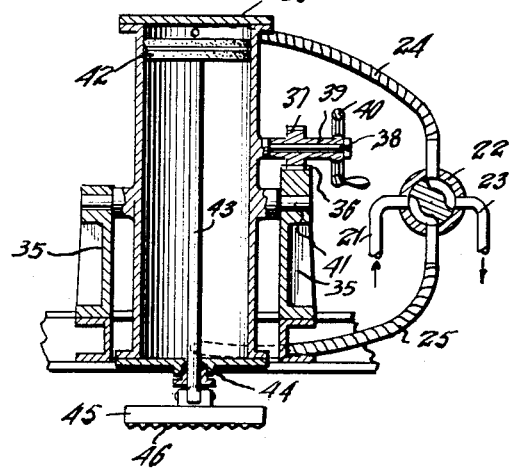

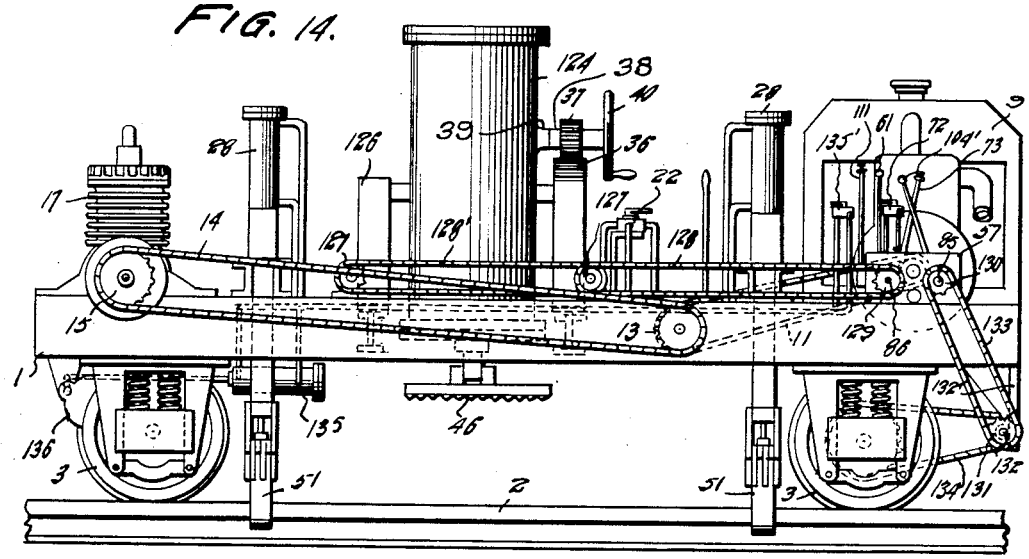

Aug. 4, 1936.　　G. J. HOLT ET AL　　2,050,179
TRACK HANDLING MACHINE
Original Filed Feb. 26, 1930　　5 Sheets-Sheet 5

Inventors
GROVER J. HOLT,
WILFRED LONGEVIN,

By　Semmes & Semmes
Attorneys

Patented Aug. 4, 1936

2,050,179

UNITED STATES PATENT OFFICE 2,050,179

TRACK HANDLING MACHINE

Grover J. Holt, Ramsey, and Wilfred Longevin, Crosby, Minn., assignors, by mesne assignments, to The Reclamation Company, St. Paul, Minn., a corporation of Delaware Application February 26, 1930, Serial No. 431,520
Renewed February 17, 1933

9 Claims. (Cl. 104—8)

The invention relates to track handling machines and more particularly has reference to that class of machines employed for raising and shifting the track.

This application is a continuation in part of an application Serial No. 365,319 filed May 23, 1929.

In the past, machines of this type have been provided with a tiltable thrust boom for raising the track and the car, the latter being secured to the track. The thrust booms in these types of machines have been mechanically operated and are mounted upon a carriage which is slidable transversely of the car.

Track shifting machines of the above described type have always possessed certain inherent disadvantages, among them being excessive strains upon certain parts of the operating mechanism such as the usual teeth provided on the boom rack, excessive shocks due to jerky operation of the boom mechanism and lack of accurate alignment in the shifting of the track because of the difficulty of close control of the shifting mechanism.

While we are aware that angularly adjustable thrust booms have been employed on the opposite sides of the car for shifting the track, these booms being mounted upon stationary supports which are immovable with respect to the car, they are mechanically operated and subject to the disadvantages outlined above.

The major object of this invention is to provide a track shifting machine having fluid pressure actuated track raising and shifting mechanism.

An equally important object of this invention is to provide a track shifting machine that operates without excessive shocks and strains upon the operating machinery.

Yet another object of the invention is the provision of a track shifting machine comprising a self propelling car adapted to travel on the track to be shifted, the car being clamped to the rails and provided with a plurality of fluid pressure actuated thrust booms for raising and shifting the car and the track.

Still another object of the invention is to provide a track shifting machine in which the power is flexibly connected and applied to the operating mechanism.

A further object of the invention is to provide a device of this character wherein the power is gradually applied, and the operating mechanism accurately controlled.

A still further object is to provide a track shifting machine which is simple, durable, efficient and economical in operation.

Yet a further object of the invention is the provision of a floating mounting for the axles of the machine.

A still further object of the invention is the devising of a transmission which may be constructed as a standard unit and is provided with a plurality of power take off shafts.

In order to make our invention more clearly understood, we have shown in the accompanying drawings means for carrying the same into practical effect without limiting the improvements in their useful applications to the particular constructions, which for the purpose of explanation, have been made the subject of illustration.

The invention comprehends the provision of a fluid actuated track handling mechanism. One method of practically effecting the concept of this invention is to mount upon a car, which is adapted to be secured to the track on which it runs, a plurality of fluid pressure actuated mechanisms for raising and shifting the car and the track.

In the drawings:

Figure 1 is a side elevation showing a track handling machine mounted upon the track and clamped to the rails.

Figure 2 is a sectional elevation taken along the line 2—2 of Figure 1.

Figure 3 is an elevation similar to Figure 2 and showing the machine in operation.

Figure 4 is a sectional view taken along the line 4—4 of Figure 2 and shows in detail a fluid pressure cylinder employed with the machine.

Figure 5 is a horizontal sectional view along the line 5—5 of Figure 1 disclosing the axle mounting for the machine.

Figure 6 is a horizontal sectional view of a power transmission means associated with the machine.

Figure 7 is a sectional elevation of the transmission taken on the line 7—7 of Figure 6.

Figure 8 is a vertical sectional view along the line 8—8 of Figure 7 and showing in detail a front elevation of the gears.

Figure 9 is a view similar to Figure 8 but taken along the line 9—9 of Figure 7.

Figure 10 is a sectional elevation of the clutch associated with the transmission and is taken on the line 10—10 of Figure 6.

Figure 11 is a detail front elevation of the gear shift guide.

Figure 12 is a sectional side elevation taken along the line 12—12 of Figure 11.

Figure 13 is a horizontal view taken along the line 13—13 of Figure 11.

Figure 14 shows a side elevation of a single cylinder track shifting machine with the transmission and clutch mounted thereon.

Figure 15 is a partial plan view of the track shifter shown in Figure 14.

Figure 16:
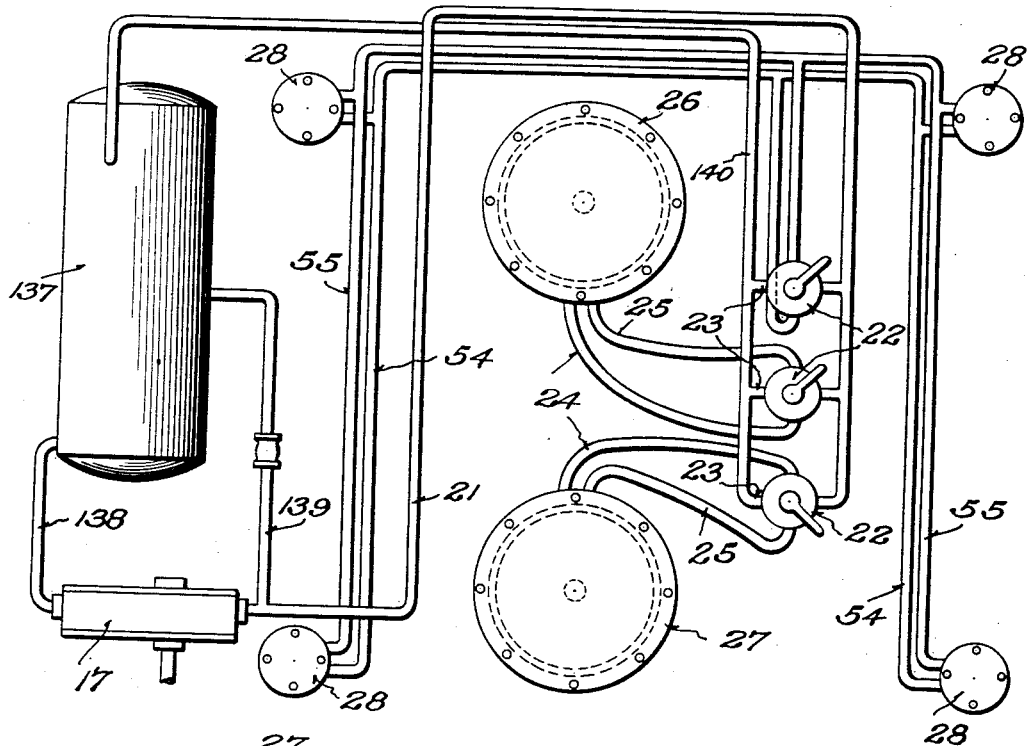
Figure 16 is a plan view of our invention in which hydraulic pressure is utilized.

Throughout the drawings similar reference numerals refer to like parts. There is shown in Figure 1 a steel frame flat car, designated by the reference numeral 1. The car is shown mounted upon tracks 2 which may be either standard or narrow gauge, and it is adapted to travel thereon. It is, of course, understood that our invention is not limited to use upon a car, but is equally applicable to a device that is not provided with wheels. For instance, a wheelless carriage may be used in lieu of the car 1.

For the purpose of supporting the wheels 3 of the car which are mounted upon axles 4, a novel construction is employed. The journals of the axles are positioned in the usual journal boxes 5 which are slidably engaged, as shown in detail in Figure 5, with the sides of stirrups 6, the upper ends of which are suitably secured to the frame of the car. The arms of the stirrup are connected by the lower cross bar 7. Mounted between the journal box and the upper cross-bar of the stirrup adjacent to the car frame are a plurality of springs 8. It should be noted that a vertical movement of the car body is allowed before the wheels thereof will be raised off of the track. The purpose of this construction will hereinafter appear.

Supported upon the frame of the car is the necessary machinery to laterally shift and to raise the track. This machinery comprises an internal combustion engine or other prime mover 9 having secured to its crank shaft a driving sprocket 10 which is connected by a chain 11 to a driven sprocket secured upon the shaft 12. This shaft in turn is provided with a sprocket 13 which is connected by means of a chain 14, to a driven sprocket 15 mounted upon the main shaft 16 of a multicylinder air compressor 17 which is provided with the customary overload relief valve 18.

Connected to the air compressor 17 is a pipe 19 leading to a pressure tank 20 from which a pipe 21 leads into three suitable control valves 22 and a pipe 23 connects each valve 22 with the exhaust outlet and serves as an exhaust mechanism, as shown in Figure 4. This pipe may exhaust directly into the atmosphere or into the atmosphere through an exhaust modifying device. Flexible pipes 24 and 25 connect the valves 22 with the lifting cylinders 26 and 27, while the four auxiliary cylinders 28, which are employed for actuating the clamp mechanism, are connected to a similar valve 22 by the pipes 54 and 55.

The prime mover 9 is actuated so as to drive the air compressor and compress the air required for the lifting cylinders and for the clamping mechanism. Suitable clutch mechanism (not shown) is provided in order that the prime mover may be clutched to the shaft 12 so as to drive the chain 14, which in turn, is connected to the shaft of the air compressor. A suitable clutch operating lever 29 is provided for actuating this mechanism.

While the fluid pressure system has been described with air as a working fluid, we wish it to be clearly understood that liquids may be advantageously employed. When liquid is employed as the working fluid, the system should be somewhat modified, in that the lower pressure side, or intake of a liquid force pump should connect with a sump or tank similar to tank 20, which is under substantially atmospheric pressure. In such a case liquid from the tank would be forced through pipe 21 to the valve structures, and exhaust fluid would be returned under reduced or substantially atmospheric pressure to the sump or tank, from which it would be recirculated. Of course, in this system a suitable pressure relief by-pass between the high pressure side of the pump and the sump may be provided. A specific structure for hydraulic operation will be described hereinafter.

Slidably keyed to one end of the main shaft of the prime mover 9 is a fly wheel 30 which is provided with a smooth face held in frictional contact by any suitable means with a driven wheel 31. In order to bring the fly wheel 30 into and out of engagement with the driven wheel 31, a suitable operating handle (not shown, but adjacent to the handle 29 and in back of the cylinder 28) may be provided. The wheel 31 is slidably keyed to a countershaft 32 along which it is moved by conventional means connected to a third operating handle 29'. It is obvious that the movement of the wheel 31 across the face of the fly wheel 30 causes changes of speed in the wheel 31 and will also reverse the direction of its rotation when it is shifted past the center of the fly wheel 30. The shaft 32 has provided on one end a crown gear which meshes with a similar gear mounted upon a countershaft at right angles to the shaft 32. This counter shaft is provided with a sprocket 33 to which is secured a chain 34 connected by suitable means to the car wheel in order that the car may be propelled along the track.

As shown in the drawings, upon the actuation of the prime mover, the air compressor may be actuated upon connecting the prime mover to the shaft 12 by the operation of the handle 29. It may also be observed that upon the actuation of the other operating levers the slidably keyed fly wheel 30 may be thrown into and out of engagement with the wheel 31 and the latter may be drawn across the face of the fly wheel 30. By the use of these levers the fly wheel and the wheel 31 may be positioned so as to propel the car along the track in any desired direction, or maintain the car driving mechanism in neutral position.

Mounted upon each side of the car are a pair of standards 35 upon which the lifting cylinders 26 and 27 are pivotally mounted by means of the trunnions 41 journaled in the upper parts of the standards. The upper end of one standard of each pair is provided with an integral gear sector 36 which meshes with a pinion 37 fixed to a shaft 38 mounted in a boss 39 on the lifting cylinders 26 and 27. The free end of each shaft 38 is provided with a suitable operating wheel 40. By turning the operating wheel 40 the pinion 37 is caused to travel over the sector 36 and rotate its cylinder about the trunnions 41 journaled at the upper parts of the standards 35. While only one standard of each pair has been shown as provided with a sector adapted to mesh with a pinion having an operating wheel therefor, it is to be understood that this construction may be employed on all of the standards without departing from the spirit of the invention.

Mounted within each cylinder 26 and 27 is a close fitting airtight piston 42 to which is attached a piston rod 43 which passes through a stuffing box 44 at the lower end of the cylinder and is pivotally secured at its free end to a shoe or pedestal 45 provided with a corrugated face 46.

Assuming that both of the pistons 42 are at the bottom of their respective cylinders 26 and 27, it will be appreciated that by positioning each valve 22 for each cylinder as shown in Figure 4, air from the storage tank 20 will be admitted through the intake pipe 21 to the valve and through the hose connection 25 to the bottom of each cylinder. This results in driving the piston upwardly and into the position shown in Figure 4. At the same time this positioning of the valve allows any fluid above the piston to pass through the hose connection 24 and out through the exhaust line 23 of each cylinder. When it is desired to lower the piston each valve 22 is turned approximately through 90°. In this position air from the intake pipe 21 will flow through the hose connection 24 and into the top of the cylinder, while the hose connection 25 will be connected with the exhaust line 23. By turning the valve through an angle of 45° the intake from the storage tank 20 and the exhaust will be closed, and the piston will be maintained in a stationary position. It will thus be appreciated that the travel of the piston 42 may be arrested at any time and in any position desired and held in such position by the suitable positioning of its valve. Likewise it will be appreciated that by providing a four-way valve for each cylinder, either or both of the cylinders may be actuated. It should be noted that a simultaneous actuation of the two lifting cylinder valves 22 will allow the simultaneous ascent or descent of the pistons within the cylinders 26 and 27.

As it has been previously pointed out the car has mounted thereon a plurality of auxiliary cylinders 28 which are employed for operating the clamp mechanism. Four such cylinders are employed and are positioned adjacent to the wheels of the car, two cylinders for each rail of the track. These cylinders have a piston and piston rod 47 which slidably passes through a lifting bar 48. The lower end of the piston rod 47 is pivotally secured, by means of a yoke 49, to clamps 50 and 51. The upper ends of the rail clamps 50 and 51 are adapted to be pivotally connected to the lower end of the lifting bar by the toggle links 52 and 53.

The operation of the clamps 50 and 51 is controlled by means of the third four-way valve 22 which has been previously mentioned. The valve 22 for the clamp cylinders 28 may be operated so that air is admitted to the upper portion of the cylinders through pipe 54 and exhausted from the lower side of the cylinders through pipe 55, or this process may be reversed by admitting air to the lower sides and withdrawing it from the upper ends of the cylinder. It will be appreciated that by the suitable positioning of the valve 22 provided for the auxiliary cylinders they may be simultaneously forced downwardly so as to cause the clamps to engage the rail. Likewise the operating valve 22 for these cylinders may be positioned so that the clamps may be raised and freed from engagement with the track and maintained in an elevated position clear of the rails.

The car, platform, or mounting may be equipped with hand or foot control brakes, as indicated by the reference numeral 56, adapted to frictionally engage the wheels thereof. If it is desired these brakes may be operated by mechanical means or by fluid pressure actuating mechanism such as the fluid cylinder and piston rod 135 for actuating the brake 136 shown in Figure 14.

While we have shown in the drawings and described the power unit as connected to the air compressor or hydraulic pump by means of chains and sprockets it is to be understood that other suitable connecting mechanism may be employed if desired. Such mechanism would include gears, belts, clutches, either separately or in combination with each other, or in combination with the chains which have been shown.

Although we have described a friction drive between the prime mover and the car wheels associated with chains and sprockets, it will be appreciated that other devices including a transmission gearing in combination with belts and/or chains may be used. Such embodiment of the power transmitting mechanism is disclosed in Figures 6 through 13 which show a transmission gearing having a plurality of power take off shafts. In order to illustrate the various features and the machines with which this transmission may be employed, Figures 14 and 15 show it applied to a single cylinder track shifter, such as described in application Serial No. 365,319, filed May 23, 1929. However, as it will hereinafter appear, the transmission may be made up as a standard unit and may be employed upon the type of machine herein described or upon any other type of track shifting devices.

As may be observed from Figure 6 the transmission including the clutch is mounted within a suitable housing which is divided into two compartments 57 and 58. The clutch compartment 58 has the crank or drive shaft 59 of the prime mover extending therethrough, and journaled therein. Secured to the drive shaft 59 of the prime mover is a conventional clutch 60 which is adapted to couple the drive shaft with the transmission gearing. The usual operating lever 61 for engaging the clutch with the transmission is shown.

It is often found desirable in mechanisms of this type to provide a brake for the clutch, and such is shown particularly well in Figures 6, 7 and 10. The brake comprises a brake band 62 which surrounds the clutch so as to frictionally engage its face when actuated. A conventional support for the brake band 62 is disclosed at 63 and also suitable actuating mechanism as well as release mechanism, adapted to maintain the brake in an inoperative position, is disclosed by the spring structure and rod shown at 64.

In order to cause the brake band 62 to frictionally engage the face of the clutch a linkage connection 65, pivotally attached to the brake band, is pivotally secured to an arm 66 which is in turn pivotally connected to the end of a shaft 67, the latter extending upwardly through the clutch housing. It will be appreciated that by pushing downwardly upon the rod 67 the ends of the brake band will be contracted and the whole band caused to engage the clutch drum or face.

To accomplish this the rod 67 is provided with a shoulder 68 which is in bearing engagement with an arm 69 secured to the piston rod 70 of a fluid cylinder 71. A conventional valve 72 is shown for operating the cylinder 71. It will be appreciated that by allowing fluid to enter the top of the cylinder the piston therein will be forced downwardly, thus causing the arm 69 to also move downwardly and cause the brake band to engage the clutch face. Upon allowing fluid to enter the bottom of the cylinder the piston and piston rod will be retracted and by reason of the spring structure indicated at 64 the brake band will move to an inoperative position and the rod 67 will move upwardly. By allowing fluid to remain in the cylinder the brake may be held in engagement or out of engagement as long as desired.

In addition to the fluid pressure means for operating the brake, there is also shown a manually operated mechanism which comprises a conventional hand lever 73 pivotally mounted at 73' and provided with a suitable release mechanism 74 positioned upon the top of the handle and extending through the brake lever. The end of the hand lever has formed thereon an arm 75 which is in bearing engagement with the top of the rod 67 when the rod is at its extreme upward position. The release mechanism 74 which comprises a spring pressed plunger extending through the lever 73 is adapted to engage the teeth of a sector 77. It will be appreciated that upon moving the hand lever toward the left, as shown in Figure 10, the rod 67 will be forced downwardly and will thus cause the brake to be applied. To release the brake the thumb piece 76 is depressed, thus counteracting the pressure of the spring upon the plunger and the lever 73 may then be moved to the right. As may be observed the brake may be operated either by the fluid pressure means or it may be manually actuated.

The end of the clutch opposite to the prime mover is provided with the usual driven shaft 78 which is suitably supported by the bearings 79 and 80 positioned in the compartment 57. Rotatively sleeved upon the shaft 78 are two gears 81 and 82. Also extending through the transmission housing and mounted in suitable bearings 83 and 84 are the power take off shafts 85 and 86 respectively, while journalled within the transmission housing, below the clutch shaft 78, is an intermediate shaft 91 to which are keyed the gears 92, 93, 96 and 97.

It may be observed that the gear 81 is in mesh with the gear 92 on the shaft 91, and that the gear 93 is in mesh with the low speed gears 87 and 88 while the gear 96, also on the shaft 91, engages the high speed gears 89 and 90. Assuming that the clutch shaft 78 is rotating in a counter-clockwise direction, as viewed in Figure 8, and that gear 81 is connected thereto in a manner hereinafter described, it is apparent that the high and low speed gears for the drive shafts 85 and 86 will be rotated in a similar direction.

In order to rotate the shafts 85 and 86 in a reverse direction from that described, that is in a clockwise direction, a reverse idler gear 94, mounted upon a stub shaft 95 which is suitably journalled in the transmission housing, is provided. From an inspection of the drawings it may be observed that the reverse idler gear 94 is in mesh with the gear 82 upon the clutch shaft and also is in mesh with the gear 97 which is keyed to the intermediate shaft 91. By this construction it is evident that when the gear 82 is connected to the clutch shaft in a manner which will be presently described, the shaft 91 will be rotated in a counterclockwise direction or in a direction opposite to that previously described. This results in rotating the high and low speed gears in a clockwise direction.

It has been mentioned that the gears 81 and 82 and the high and low speed gears on both of the power take off shafts are sleeved onto their respective shafts so that the shafts may rotate without causing the gears to be turned. In order to couple or connect these gears to their shafts the coupling members 98, 99 and 100, which slide respectively upon the splined portion of the shafts 78, 85 and 86 are provided. The ends of these coupling members engage suitable notches or recesses formed upon the ends of the sleeves on which the high and low speed gears and the clutch gears are mounted. These coupling members are caused to be thrown out of engagement by means of suitable shafts journalled within the transmission housing at right angles to each other.

In order to operate the coupling member 98 a shaft 101 is slidably mounted in the journals 102 positioned in the transmission housing. The shaft 101 is provided at 102' with a suitable device to prevent it from moving entirely out of the journals. From an inspection of Figure 9 it will be noted that a bifurcated engaging member 103, adapted to engage the coupling member 98, is fixedly mounted upon the shaft 101. For the purpose of shifting the coupling member into and out of engagement with the clutch gears 81 and 82 a collar 104 is fixedly mounted upon the shaft 101 and this collar is engaged by the bifurcated end of a pivotally mounted operating lever 104' which extends through the transmission casing.

It will be seen from an inspection of Figure 7 that upon moving the lever 104' towards the right, the shaft 101 to which it is engaged will be moved towards the left and this will cause the coupling member 98 to be moved in a similar direction and to engage the gear 81. Upon moving the operating lever 104' to the left the shaft 101 will be moved to the right and the coupling member 98 will be engaged with the reverse gear mechanism 82. Thus it will be appreciated that the operating lever 104' is the means for reversing the direction of the rotation of the shafts 85 and 86, in that by its actuation it will cause the coupling member to engage either the gear 81 or the gear 82, the latter being in mesh with the reverse idler.

The coupling members 99 and 100 employed to engage the high and low speed gears on each of the power take off shafts are actuated by the rock shaft 105 and the tubular rock shaft 107 which is sleeved thereon so that either may be rotated without causing the rotation of the other. As it may be noted the rock shafts 105 and 107 are positioned perpendicularly to the clutch shaft.

Shaft 105 is suitably journalled in the transmission housing and has fixedly mounted thereon a bifurcated engaging member 106 which engages the coupling member 99. It will be appreciated that by rocking the shaft 105 clockwise as shown in Figure 7 the coupling member 99 will be caused to engage the low speed gear 87 while upon rocking it counter-clockwise it will engage the high speed gear 89. Engagement of the coupling member 99 with either the high or low speed gears will of course effect rotation of the shaft 85 when the respective gear is revolving.

A similar construction is disclosed for moving the coupling member 100 which is connected to the rock shaft 107 through the arms of a bifurcated engaging member 108, the member 108 being fixedly connected to the shaft. It will be appreciated that the clockwise movement of the rock shaft 107 in Figure 7 will cause the coupling member 100 to engage the low speed gear 88 while upon moving it counter-clockwise the coupling member will be engaged with the high speed gear 90.

For the purpose of actuating the rock shafts 105 and 107 the mechanism shown in Figures 6, 11, 12 and 13 is employed. In Figure 6 there is shown a gear shift guide member 109 provided with an H slot 110 through which a gear shift lever 111 extends. The gear shift lever 111 has a spring pressed plunger 112 extending therethrough, the lower end of which is provided with a foot 113 the purpose of which will presently appear. From an inspection of Figure 12 it may be observed that the lower end of the gear shift lever 111 is provided with a plurality of arms 114 which are pivotally secured to arms 114' formed upon a mounting or supporting member 115, the base 116 thereof being circular in shape and provided with an opening through which the shafts 105 and 107 extend. It should be noted that the base of the mounting member is in the form of a flange plate and is held flush with the transmission housing by means of the gear shift guide 109 which is secured to the housing by means of the bolts 109'. This construction, it will be appreciated, allows the mounting member 115 to be rotated.

The rock shaft 107 has fixedly mounted thereon an arm 117 provided with a recess having positioned therein a notched engaging dog 118, which is maintained in an upward or extended position by reason of the spring 119. A similar arm 120 provided with an engaging dog 121 and spring 122 is mounted upon the rock shaft 105. From an inspection of Figure 12 it will be appreciated that the upper part of the gear shift guide is provided with a plurality of recesses 123 which are engaged by the engaging dogs 118 and 121.

In the construction shown the gear shift lever may be rocked about the axis of the rock shafts 105 and 107 and likewise it may be moved into either of the longitudinal slots of the H. Upon moving gear shift lever 111 to the right as shown in Figure 12 it will be seen that the foot piece 113 will be directly over the engaging dog 118. When the spring pressed plunger is moved downwardly the foot piece 113 will force the engaging dog downwardly to the bottom of the recess in which it rests and will free it from engagement with the notch 123. In this position the foot 113 will cooperate with the recess in which the engaging dog is located so as to allow the arm 117 to be rocked and thereby cause the coupling member 100 to be shifted as desired. When a similar operation is gone through the gear shift lever being moved towards the left as shown in Figure 12, it will be appreciated that the coupling member 99 may be shifted into and out of engagement with either the low speed gear 87 or the high speed gear 89.

Upon releasing the plunger 112, either of the arms 117 or 120 being positioned below a recess 123 as shown in Figure 12, its engaging dog will cooperate with the recess and will maintain its arm in that position.

The operation of the whole transmission will now become apparent. Assuming that the motor or prime mover is rotating in a counterclockwise direction, as shown in Figure 8, and it is desired to move the drive shaft 85 in a similar direction, the reverse lever 104' is moved to the right so as to cause the coupling 98 to engage the gear 81. This causes the gears 87 and 89 to be revolved upon the shaft 85. It is now desired to connect the shaft 85 to the low speed gear. In order to do this the plunger 112 is depressed and the gear shift lever is moved into the outer slot of the H as shown in Figure 6 and it is then moved towards the right after which it is engaged in this position by merely releasing the spring pressed plunger. The clutch is then slowly moved into operating position and the power shaft 85 is rotated in a counterclockwise direction. When changing speed the clutch is "let out", the plunger 112 depressed and the gear shift lever moved to the left in the outer slot of the H. This causes the coupling 99 to engage the high speed gear 89. When it is desired to arrest the movement of the drive shaft 85 the clutch is again "let out" and the gear shift lever and the reverse lever are moved into inoperative positions.

Should it be found desirable to rotate the shaft 85 in a reverse direction, assuming that the transmission is uncoupled from the prime mover, the reverse lever 104' is moved to the left as shown in Figure 7, which causes the coupling 98 to engage the gear 82. Through the reverse idler 94 it will be appreciated that the direction of rotation imparted to the shaft 85 will be opposite to that previously described. When the reverse mechanism is in operation it is apparent that the manner of shifting gears is similar to that given above.

When it is found desirable to operate the shaft 86 the reverse lever 104' is placed in the desired position so as to impart to the shaft the desired direction of rotation and the gear shifting lever is moved to the inner slot of the H as shown in Figure 6. Movement of the lever then towards the right causes the coupling member 100 to engage the low speed gear while movement of it to the left causes it to engage the high speed gear on the shaft 86.

It will be appreciated from the foregoing description that we have provided a double power take off shaft transmission which may be built as a standard unit. As shown at Figure 14 the transmission is applied to a single cylinder track shifting machine such as described in application Serial No. 365,319, filed May 23, 1929. The difference between the track shifter shown in Figure 14 and that in Figures 1 through 4 resides in the fact that only one cylinder 124 is disclosed. The cylinder 124 is mounted upon the standards 126 which are slidable transversely of the car. The remainder of the machine including the air compressor, track clamps, valves, etc., is the same.

In order to move the cylinder 124 transversely of the car worm shafts 127 engaging threaded follower members secured to each of the standards 126 are employed. These worm shafts are provided with suitable sprockets which are connected by means of chains 128 and 128' to the sprocket 129 mounted upon the end of the power take off shaft 86. As it has been previously described, through suitable operation of the clutch lever 61, the reverse lever 104' and the gear shift lever 112, the power takeoff shaft 86 may be rotated as desired and because of its connection with the worm shafts, the standards and cylinders may be moved to either side of the car.

Secured to the power take off shaft 85 is a sprocket 130 which is connected by means of a chain 133 to a sprocket 131 carried on countershaft 132. The countershaft 132 which is mounted on a bracket 132' secured to the car carries a second sprocket (not shown) which is connected to the driven axle of the track shifter by means of a chain 134. It will be apparent from the description previously given that through the suitable operation of the levers 61, 104' and 112 the car may be driven upon the rails in any desired direction.

In the construction shown in Figure 14 a drive for the air compressor or hydraulic pump similar to that previously described is employed. While the transmission has been shown as applied to a single cylinder track shifter, it will be appreciated that it may be readily applied to the two cylinder machine disclosed in Figures 1 through 4. When it is applied to the two cylinder machine the auxiliary power take off shaft 86 may idle, or if it is desirable by eliminating suitable gears this shaft may be dispensed with entirely.

From the foregoing description the operation of the track shifter will be at once apparent. When either the two cylinder or single cylinder machine is employed, the car, platform, or mounting is propelled to the point where the track is to be raised or shifted by use of the propelling mechanism previously described. After it has reached the desired point the travel of the car is arrested and the track clamps 50 and 51 are lowered and secured to the rails. The raising and shifting mechanism may now be operated so as to raise and shift, or merely raise the car and the track.

The operation of the valves 22 for actuation of the various cylinders is, of course, obvious. As heretofore stated, each of the cylinders 26 and 27 has a valve 22, and all four of the clamp cylinders 28 are operated by a single valve similar to the valve 22. When it is desired to raise the clamps, or the thrust booms 43, the valves are turned to a position as indicated diagrammatically in Figure 4, in which air under pressure is admitted to the lower part of the cylinder, below the piston, and that part of the cylinder above the piston is exhausted. On the other hand, when it is desired to lower the clamps or the thrust booms, the valve is turned 90° from the position indicated in Figure 4, whereby the lower part of the cylinder is exhausted, and air is admitted to the cylinder above the piston.

In the operation of the two cylinder machine assume for example, that the track is to be lifted only. In this event, both the cylinders 26 and 27 are maintained in their vertical position and the pistons are lowered until the shoe 45 attached to each piston is in contact with the ground. This operation is accomplished by the suitable positioning of the lifting cylinder valves 22. Upon allowing air to further enter the top of each cylinder the pistons will be depressed with a consequent upward movement of the car and the track. After the car and track have been raised a sufficient distance the lifting cylinder valves may be closed so as to permit the car and track to remain in this elevated position. If, for example, it is desired to place ballast underneath the ties, this operation is completed and by the operation of the lifting cylinder valves the track may be lowered to its new elevation. It will be appreciated that one side of the track may be elevated to a lower or less extent than the other by the use of this structure. This may be accomplished by arresting the downward travel of one of the pistons before arresting the downward travel of the other piston. It will likewise be seen that either of the cylinders when positioned in a vertical plane may be employed to merely raise the side of the track adjacent to its piston.

Should it be desired to raise and shift the track, only one piston is employed. If the track is to be shifted to the left as shown in Figure 3 the piston in the cylinder 26 is so actuated that it is withdrawn to the upper end of the cylinder, and as a consequence frees the shoe 45 supported by its piston rod. The cylinder 27 upon the left hand side of the car is given a correct angle of tilt and its piston is lowered until its shoe is in contact with the ground. Further downward actuation of the piston with respect to its cylinder will cause the car and the track to which it is clamped to be raised, shifted and lowered to the position indicated by the dotted line of Figure 3. While the track is being lowered the cylinder 27 is pivoted about its trunnions 41 and it swings to the left, as is shown in Figure 3. It is apparent that during this operation the movement of the piston within its cylinder may be arrested at any time desired by merely closing the fluid pressure valve connected to the cylinder, and further that after arresting such movement it may again be started by operating this valve.

While the method of shifting the track and car to the left has been described, it will be well understood that by the similar use of the right hand cylinder 28 the car and track may be shifted to the right.

Although we have shown and described the use of only one cylinder of the double cylinder machine for shifting the track, it will be appreciated that by employing two elongated cylinders, with a relatively smaller bore than those shown, both cylinders may be employed either in the raising operation or in the shifting operation. In such construction, if the track were to be shifted to the left, both cylinders would be tilted towards the left similarly to the position of the cylinder 27 shown in Figure 3. Since both of these cylinders would possess a comparatively great length it would be appreciated that the stroke of the piston on the right would be sufficient to aid in shifting the track. When both cylinders are employed in the shifting of the track, the thrust boom on the far side is positioned outside of the rail 2.

While we have described the operation of the two cylinder track shifting machine it will be apparent that the single cylinder machine shown in Figures 6 through 15 operates on substantially the same principle, its operation being described in detail in application Serial No. 365,319.

In both machines the track raising and/or shifting operation having been completed, the shoes of each piston rod are withdrawn to their elevated position and maintained there by the proper manipulation of the lifting cylinder control valves. The cylinder or cylinders, as the case may be, are vertically positioned and the track clamps are withdrawn from their engagement with the track. The car may then be moved to another position on the track which is to be lifted and/or shifted and the same cycle of operations gone through.

If it is desired a safety device in the form of a suitable brake may be positioned so as to engage the pinion 37 and prevent its rotation with a consequent movement of its cylinder while the car is being propelled along the track.

The reason for floating the journals within the stirrups 6 will now be at once apparent. It frequently happens that some slack or play develops in the track clamps. In the usual track shifting machine the car wheels are directly mounted to the car frame. Should there be any play in the clamps as just described, it is evident that upon actuating the lifting mechanism the car and its wheels will be raised off of the track before the clamps take hold. This results in derailing the car. By the use of floating journal mountings this disadvantage in construction will be overcome and if there is any play in the track clamps the car frame will be raised a slight distance before the wheels will lift off of the track. Moreover by mounting the springs on the journal boxes it will be appreciated that the jar of traveling on an uneven roadbed and irregular rail joints will be reduced to a minimum and the life of a car and its equipment will be considerably increased.

As the car body may ride either upwardly or downwardly upon the wheels and the wheels may move upwardly with respect to the car body, better results are obtained by connecting the driven car axle to the prime mover through the counter shaft 132. This is the preferred construction and it will be appreciated that it substantially prevents the disengagement or breakage of the chains 134 and 133 when the movement of the car body or vertical movement of the wheels occurs.

Figure 17:
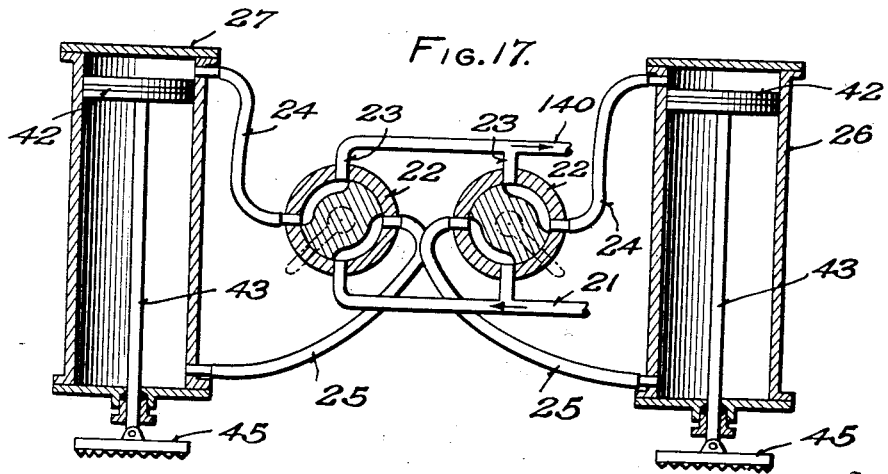
Figure 17 is a sectional view showing diagrammatically the arrangement of valves and cylinders in a hydraulically operated machine.

In Figures 16 and 17, there is shown an apparatus for actuating the various cylinders by hydraulic pressure instead of by air pressure. The arrangement is generally similar to that employed in the compressed air machines, with certain modifications to adapt it for hydraulic operation. The pump 17 is, of course, of the hydraulic pressure type instead of being an air compressor, and receives its supply of liquid from a sump tank 137 by way of pipe 138. Also, it will be noted that a by-pass line 139 runs from the pressure line 21 to the sump tank, and is provided with a suitable pressure valve positioned therein. The major difference between a hydraulic system and the compressed air system resides in the fact that each of the exhaust lines 23 from the valves 22 empties into a line 140 which returns the exhausted liquid to the sump tank 137, from whence it may be withdrawn and re-compressed by the pump 17 as needed.

It may be seen that by employing fluid pressure actuated mechanism a fluid cushioning effect is obtained which is not present in purely mechanically actuated track machines of this type. Hence sudden jerking and jarring on the principal parts of the machine are obviated. Moreover there are no parts on the machine, such as rack teeth on the boom, which may be snapped off due to their sudden overstressing. Not only is this due to the power means employed, but also the flexible and easily controlled application of it to the operating mechanism. Such fineness of control, it will be appreciated, readily lends itself to accurate operation in aligning the raised or shifted track.

From the foregoing description it will be appreciated that we have provided a track handling machine which possesses great durability and is of simple operation, and moreover a machine which readily lends itself to accurate operation, permitting a fineness of alignment to the raised or shifted track has been devised.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

We claim:

1. A track handling device comprising a carriage adapted to be clamped to a track, a plurality of cylinders pivotally mounted on the carriage and laterally spaced thereon, a ground-engaging thrust boom reciprocable in each cylinder, and common means to furnish a fluid under pressure to the cylinders to actuate the thrust booms to thereby cause a raising, or a raising and shifting, of the track.

2. A track handling device comprising a carriage adapted to be clamped to a track, a pair of cylinders laterally and pivotally mounted on the carriage, a ground-engaging thrust boom reciprocable in each cylinder, and common means to optionally furnish a fluid under pressure to either cylinder to actuate the respective thrust boom and to thereby cause a raising, or a raising and shifting, of the track.

3. A track handling device comprising a car adapted to run upon a track, means for clamping the car to the track, a cylinder pivotally mounted on each side of the car, a ground-engaging thrust boom reciprocable in each cylinder, and common means to optionally furnish a fluid under pressure to either cylinder to actuate the respective thrust boom and to thereby cause a raising, or a raising and shifting, of the track.

4. A track handling device comprising a car adapted to travel on a track, means to clamp the car to the track, fluid pressure actuated means to operate the clamping means, a cylinder pivotally mounted on each side of the car, a thrust boom reciprocable in each cylinder, and common means to independently furnish a fluid under pressure to the clamp-actuating means or to the cylinders.

5. A track handling device comprising a carriage, means to secure the carriage to the track, a pair of cylinders, means fixedly mounted on one side of the car to pivotally support one of the cylinders, means fixedly mounted on the other side of the car to pivotally support the other cylinder, a ground-engaging thrust boom reciprocable in each cylinder, means to effect a pivoting of the cylinders upon their respective supports, and common means to optionally supply fluid under pressure to either or both of said cylinders whereby the track may be raised, or raised and shifted.

6. A track handling device comprising a car adapted to travel on a track, means for securing the car to the track, a cylinder pivotally mounted on one side of the car, another cylinder pivotally mounted on the other side of the car, a ground-engaging thrust boom in each of said cylinders, and common means to furnish a gas under pressure to either of said cylinders to thereby effect a raising, or a raising and shifting, of the track.

7. A track handling device comprising a car adapted to travel on a track, means for clamping the car to the track, a cylinder pivotally mounted on each side of the car, a thrust boom reciprocable in each cylinder, a liquid reservoir, means for transmitting liquid from the reservoir under pressure to either of said cylinders, and means for returning liquid from either of said cylinders to the reservoir.

8. A track handling device comprising a car adapted to travel upon a track, means for clamping the car to the track, fluid actuated means for operating the clamping means, a ground-engaging thrust boom pivotally mounted on each side of the car, fluid-actuated means for operating each thrust boom, a fluid reservoir, and means for supplying fluid from said reservoir under pressure to either of said thrust boom actuating means and the clamp actuating means.

9. A track handling device comprising a car adapted to run on a track, a pair of track-engaging clamps for each rail, said clamps being simultaneously operable by means of cylinders, a pair of stationary pedestals mounted on each side of the car, a cylinder pivotally carried by each pair of pedestals, means cooperating with a pedestal to rotate its cylinder about its pivot, a piston adapted to reciprocate in each cylinder and carrying a thrust boom, a ground-engaging shoe pivoted at the lower end of each thrust boom, a fluid reservior, means to compress the fluid in the reservoir, actuating means for the compressing means and also adapted to propel the car on the tracks, and means for optionally supplying fluid from the reservoir to the clamp cylinders and the pivoted cylinders.

WILFRED LONGEVIN.
GROVER J. HOLT.